Patented Feb. 16, 1943

2,311,343

UNITED STATES PATENT OFFICE 2,311,343

MILK PRODUCT AND THE MANUFACTURE THEREOF AND COMPOSITION THEREFOR

Victor Charles Emile Le Gloahec, Rockland, Maine, assignor to Algin Corporation of America, New York, N. Y., a corporation of Delaware No Drawing. Application September 10, 1938, Serial No. 229,295

8 Claims. (Cl. 99—25)

This invention relates to products and preparations containing milk and to the preparation thereof and to compositions for use in connection therewith. This invention relates especially to the preparation of such products and preparations wherein ingredients of milk constitute the principal constituents and occur in a colloidally dispersed state. This invention is particularly useful in the preparation of milk-containing food products such as ice cream, chocolate syrup, milk chocolate, malted milk, and the like.

For purposes of illustration this invention will be described in connection with ice cream and the manufacture thereof. Ice cream contains not only all the elements of milk, but also additional albuminous substances and caloric compositions supplied by materials such as eggs, butter fat and assimilable carbohydrate matters in the form of sugar, e. g., a mixture of 70% cane sugar and 30% corn sugar.

In the manufacture of ice cream it is important to stabilize the albuminous content of the ice cream both during the manufacture of the ice cream and during storage of the frozen mix. Ice cream mixes are usually pasteurized prior to freezing and the heat of pasteurization tends to decrease the stability of the albuminous materials in the mixes. There have been several proposals for stabilizing the albuminous materials in ice cream. Many products have been used for this purpose such as gelatin, Irish moss, carob, lecithin in the form of egg yoke, etc. The use of all these materials is attended with disadvantages due to such things as bacteriological contaminations, impairment of flavor or adverse action on texture. None of these materials or the equivalents of those heretofore used has solved in a satisfactory manner the problem of successfully stabilizing ice cream mixes.

It has also been proposed heretofore to incorporate in ice cream mixes the hydrophilous colloid that is recovered from seaweed heretofore chiefly identified in combination with various soluble metallic salts under the general classification of alginates and more accurately to be termed "algin" or "alginous material." Alginous material has remarkable properties as an emulsifying dispersing and stabilizing agent. Alginous material is advantageous not only because of its effect in increasing the viscosity of the material with which it is mixed, but also because it has the tendency to maintain particles or granules in suspension adsorbed on or with the alginous miscelles. Alginous material also has an emulsifying effect due to the fact that it lowers the superficial tension of the continuous phase of the emulsion.

The characteristics of alginous material above described are especially pronounced when the alginous material is prepared in true colloidal form and are most pronounced when the alginous material is directly soluble in water to produce a solution having a pH less than about 4.5 and when a 1% solution of the product has a viscosity of approximately .4 to .6 poise. The preparation of alginous material of this type is described in Patent No. 2,128,551, which was granted on an application filed by John Robert Herter and myself.

In ice cream mixes the alginous material is also desirable, in that it greatly improves the smoothness and texture of the ice cream. It also brings out the flavor and aroma of the substances in the ice cream mix and therefore improves the palatability of ice cream.

Notwithstanding the normally desirable attributes of the use of alginous material in milk products such as ice cream, there has been one very serious difficulty incident to the use of alginous material for such purposes. When alginous material is included in milk products such as ice cream, the alginous material tends to coagulate and thus lose its valuable properties as a colloidal stabilizing and emulsifying agent.

Milk contains a number of different ingredients, the total solids of milk being in the neighborhood of 12 to 13%. The mineral salt contents of milk contains about 20% of calcium figured as calcium oxide. Much of this calcium occurs in the milk in the form of calcium combined with protein (including casein) in a form which can be stably dispersed in the milk. Some of the calcium, however, namely, about .115% to .125% of the milk, occurs as a water-soluble salt, this salt being for the most part calcium chloride. This water-soluble salt, or at least the bulk thereof, occurs in an ionized condition, the solution of the calcium being dependent primarily upon its existence in an ionized state.

It is the dissolved calcium salt which has an adverse effect upon alginous material when alginous material is added to a milk product such as ice cream, inasmuch as the free calcium of the ionized calcium salt has an affinity for alginous material and tends to effect a coagulation of the alginous material. If alginous material were added to an ice cream mix, for example, and coagulated due to the free calcium, the coagulated alginous material might be filtered off. This, however, would serve no useful purpose, as the alginous material would be added simply to be subsequently removed, and is furthermore undesirable in that it would remove from the ice cream some of the calcium, the inclusion of which is very important because of its nutritive value. Calcium is an important food element, being very valuable in connection with the structure of the bones and teeth. It has been estimated that about one gram of calcium is required per day for the maintenance of good health. If, on the other hand, the alginous coagula containing calcium were left in the ice cream, the coagula would detract from the smoothness of the mixture and the coagulated alginous material would have substantially no effect as a stabilizing agent. Moreover, the calcium in the alginous coagula being in stable combination with the insoluble alginous coagula, would be unassimilable and would not have any substantial nutritive value.

If an ice cream mix is treated with a substance such as a tartrate, citrate, or sodium phosphates having the capacity to precipitate the dissolved calcium as an insoluble calcium compound, this method of meeting the problem is also objectionable. If the ice cream mix is filtered, much of the precipitated calcium is removed and its nutritive value lost. The pasteurization of the ice cream promotes the growth of the insoluble particles and the loss of calcium during filtration. Any fine particles of precipitated calcium compound that do pass through the filter are not stable but tend to increase in size and to detract from the smoothness and texture of the ice cream. Moreover, the precipitated calcium is unassimilable. If the ice cream mix is not filtered, the presence of the unassimilable particles of precipitate is objectionable.

It is a purpose of this invention to overcome the difficulties which have been mentioned hereinabove in the production of milk products such as ice cream which are highly stable and homogeneous. According to this invention, the free calcium in solution in the ice cream mix as calcium chloride is treated with a substance which forms, with the calcium, a substantially non-ionizing compound in colloidal form that can be readily dispersed in the product. In this manner, the calcium is transformed from a condition in which it tends to coagulate the algin to a condition in which it no longer has this effect. Moreover, since the calcium chloride has an adverse effect on the stabilization of the albuminous material in colloidal suspension in the mixture, the change in the form in which the dissolved calcium salt of the milk occurs, is beneficial in itself. It is notable that the calcium is not removed from the mixture and that it is maintained in a form which can be readily assimilated. It is preferable according to this invention to incorporate in the milk ingredients contained in the product a caseinate which has the capacity to combine with the calcium of the dissolved calcium salt of the milk to form calcium caseinate. Ordinary casein at pH value of about 4.6 to 4.7 does not have the property of uniting with the calcium of a dissolved calcium salt to form calcium caseinate. However, when the casein is preliminarily treated to convert it to a caseinate and particularly a soluble caseinate, the dissolved calcium salt can be modified so that the calcium no longer occurs in an ionized state.

Casein is a protein substance having acidic characteristics. Considerable research has heretofore been done in connection with casein and casein compounds. Apparently casein contains a plurality of acid functions or radicals, which radicals have the capacity to react with substances such as alkali metals or alkaline earth metals to form caseinates. Caseintes are recognized in the art according to their number. Caseinates have been numbered according to an arbitrary rule, the casein number being the number of milligrams of calcium oxide that combines with 30 grams of casein. According to Van Slyke's classification, a monocalcium caseinate has a number of about 100. The number of his biocto caseinate is about 1500. The adsorption of 1500 mg. of calcium oxide per 30 g. of casein in the form of calcium caseinate represents a limit beyond which it is undesirable to go inasmuch as conversion of the acid radicals beyond the first sixteen is attended by degradation of the casein through release of the nitrogen in its amine functions. Depending upon the number of the caseinate the pH of the caseinate varies. The caseinate having a number about 588, the hexacaseinate of Van Slyke, has a pH of substantially 7. The caseinates having a number lower than 588 have a lower pH than 7 and the caseinates of a higher number have a higher pH.

The caseinate which I prefer to use in the practice of this invention is caseinate of sodium. While any caseinate of sodium may be used in the practice of this invention, it is preferable to use a caseinate of sodium having a high number so as to convert the maximum possible amount of $CaCl_2$ with the least amount of caseinate of sodium. While a caseinate having a pH less than 7 may be used, it is preferable to use a caseinate having a pH above 7 and especially desirable results are obtained when the pH of the sodium caseinate is around 10. A caseinate having a number above aboot 400 preferably is used.

When a caseinate of sodium is included in the milk ingredients of the mixture, there is a double decomposition, the sodium of the caseinate of sodium being replaced by the calcium of the calcium chloride in solution in the milk. In the practice of this invention the caseinate of calcium which is formed is in a colloidal state and is easily dispersed in the composition. Moreover, the calcium is in a form which is readily assimilable. This, in itself, is of advantage, inasmuch as the adverse effect of the calcium chloride on the stability of the mixture is removed. In addition, it is also important that the calcium is converted into a form which is not ionized and which, therefore, has substantially no action tending to coagulate algin, which is preferably included in the mixture as a stabilizing agent. The advantages of the alginous material as a stabilizing and emulsifying agent and as an agent adapted to bring out the flavor and aroma of the ingredients, therefore, can be realized in full according to this invention while at the same time preserving the calcium in an assimilable form and in a form which is colloidally dispersed in a stable condition in the mix.

The reason why caseinates of sodium having a high number are regarded as preferable to caseinates having a low number in the practice of this invention, is that in sodium caseinates having a high number there are more sodium ions which are combined with acid functions of the casein and which are available for replacement by calcium ions in solution. Therefore, the caseinates of sodium of high number are especially effective in removing from the mixture ionized calcium of dissolved calcium salt of milk ingredients. Even if the caseinate of sodium includes a slight excess of alkali, this excess alkali is not undesirable, inasmuch as any minute quantities of calcium oxide or hydroxide which might be formed would tend to be adsorbed on the calcium caseinate that is also formed. In fact, a slight excess of alkali, in addition to that required to saturate the casein, is normally to be preferred.

The simple sodium salts of the acid functions of casein are referred to herein as sodium caseinate and may be used according to this invention. There are, however, other more complex forms of caseinates comprising sodium. Sodium caseinate, as well as the more complex forms of casein with sodium are referred to herein generally as caseinates of sodium. The complex caseinates are especially effective in combining with ionized calcium of dissolved calcium salt of the milk in the milk product. Sodium phosphocaseinate has been found by me to be especially effective in converting the ionized calcium to substantially non-ionized and colloidally-dispersed calcium compounds. This substance forms with the dissolved calcium of milk large transparent miscelles which take on a milky appearance due to adsorption by the phosphorus within the miscelles of an additional quantity of the dissolved calcium. The sodium phosphocaseinate is preferably prepared by first forming with sodium salt a sodium caseinate of high pH corresponding equimolecularly, for example, to the biocto caseinate of Van Slyke, i. e., a calcium caseinate at 1500. The caseinate of other alkali metals than sodium may also be availed of. The next step is one of retrogradation using phosphoric acid until a monophosphocaseinate having a number of about 100 is obtained. Then an alkali such as sodium bicarbonate is used until a sodium phosphocaseinate is obtained having a sufficiently high number. For example, a sodium phosphocaseinate corresponding equimolecularly to the biocto caseinate of Van Slyke may be produced. A sodium phosphocaseinate thus produced has the capacity to absorb as much as about 3.5% by weight of calcium as Ca. Moreover, the calcium, when combined with the sodium phosphocaseinate, results in a calcium phosphocaseinate that is in a highly dispersed and colloidal state. The quantity of calcium that is taken up by the sodium phosphocaseinate as calcium phosphocaseinate is increased by a secondary tendency of the resulting calcium phosphocaseinate to hold dissolved calcium chloride adsorbed on the surface of the miscelles of calcium phosphocaseinate in a non-ionized condition and in the form of chlorocaseinate of calcium.

In another modification of the invention a mixture of sodium caseinate and sodium phosphocaseinate is added to the milk ingredients of a milk product to transform free calcium in the milk into calcium caseinate and calcium phosphocaseinate. The formation of calcium caseinate and calcium phosphocaseinate results in a subsequent adsorption of calcium chloride to form chlorocaseinate of calcium and chlorphosphocaseinate of calcium. The ability of simple calcium caseinate to adsorb $CaCl_2$ is greater than that of calcium phosphocaseinate, although the use of sodium phosphocaseinate together with sodium caseinate in the process is desirable, as hereinabove stated, by reason of its ability to attract additional quantities of calcium by adsorption upon the phosphorus within the miscelles. For this purpose I can use sodium phosphocaseinate prepared as mentioned above. I can mix with the sodium phosphocaseinate a sodium caseinate. In order to promote the formation of chlorocaseinate of calcium, I preferably use a sodium caseinate having a low number and having a pH of about 5.9 to about 6.93 which is a little under the hexacaseinate of Van Slyke. Any ionized calcium of dissolved calcium salt in the mixture will react by double decomposition with the caseinates of sodium, and in addition, part of the calcium chloride of the milk will be adsorbed in the form of chlorocaseinate of calcium so that the calcium is no longer in an ionized condition. The products formed by interaction of a chemical or physicochemical nature between casein and calcium in the form of calcium caseinate, calcium phosphocaseinate, chlorocaseinate of calcium or the like are referred to generally herein as caseinate compounds of calcium.

The amount of caseinate of sodium that should be added to the milk ingredients of a milk product may be readily determined under any given conditions. It has been mentioned hereinabove that milk is known to normally contain about 0.120% of calcium in solution in the form of calcium chloride. Therefore, the number of milligrams of dissolved calcium in the product (calculated as calcium oxide) can readily be determined. The number of grams of casein to form a calcium caseinate of a given number (preferably a high number such as 1500 is selected) is readily determinable. The required amount of casein is converted into a sodium caseinate or sodium phosphocaseinate, for example, of a corresponding number. This can be done by reacting the casein with an alkali such as sodium hydroxide or sodium bicarbonate. The amount of alkali that is required may be readily ascertained, two mols of the alkali, e. g., sodium carbonate, being the equivalent of one mol of calcium oxide. The number of mols of calcium oxide is determined by calculating the amount of free calcium in the milk in terms of calcium oxide. For example, in the usual case of a milk product such as ice cream containing 12% solids and about .12% of dissolved calcium salt, I may incorporate in the mixture about .5% to about 1% of sodium phosphocaseinate or sodium caseinate or a mixture of both of these materials depending on the number of the soluble caseinate material that is used, the desired amount being calculated as above described so that the amount of the particular soluble caseinate that is used will be substantially the molar equivalent of the dissolved calcium salt in the milk. When the soluble caseinate is used in the amount that is substantially the molar equivalent of the dissolved calcium salt in the milk, the calcium caseinate is formed in a state of colloidal suspension without physical precipitation of calcium and will pass through a filter in the same way that the normal ingredients of milk will pass through a filter.

By the addition of caseinate of sodium in the manner described the dissolved calcium salt of the milk in the ice cream or other milk product is transformed to a colloidal caseinate compound of calcium in which the calcium is held in a substantially non-ionized condition. The product in this way can be rendered substantially free of inorganic calcium salts. The caseinate thus formed is a colloid which is readily dispersed and maintained in stable colloidal suspension by the "protective colloid" action of alginous material. The transformation of the dissolved calcium salt into the colloidal caseinate compound of calcium in itself constitutes an improvement in the manufacture of ice cream or other milk products and in itself constitutes one of the features of this invention.

By the addition of alginous material to the treated mix, the benefits and advantages thereof that are referred to more in detail hereinabove may be fully realized. In the example given above in connection with an ice cream mix, the addition of alginous material such as about .2% to about .3% of the total mixture is all that is required to stabilize the mixture including the caseinate of calcium that is formed by the incorporation of a caseinate substance in the ice cream mix. Since the ionized calcium of the dissolved calcium salt of the milk has been transformed into a colloidal form in which the calcium is substantially non-ionized the algin exercises its full effect as a stabilizing agent and produces an extremely smooth, stable and homogeneous colloidal mixture.

The caseinate of calcium should be added either prior to or simultaneously with the incorporation of the alginous material. If the alginous material were to be added to the milk ingredients of the mix before the caseinate of sodium was added, the dissolved calcium salt in the milk ingredients would tend to coagulate the alginous material, with the disadvantages mentioned above. However, when the alginous material is added simultaneously with the caseinate of sodium, the affinity of the caseinate of sodium for the calcium is so much stronger than the affinity of the alginous material for the calcium, that the free calcium goes into the form of calcium caseinate without exercising a coagulating effect on the alginous material. Whether this preferential affinity is due to adsorption phenomena, static electrical phenomena, "Brownian" movement phenomena, or some other phenomena, cannot definitely be stated. The fact is, however, that the calcium goes into the form of a caseinate of calcium, leaving the alginous material uncontaminated by calcium so that it may exercise in full its stabilizing and other beneficial effects on the mixture.

In the manufacture of ice cream, the various materials in the ice cream mix are in actual practice first blended together and then pasteurized at about 165 to 175° F. for about 30 minutes. The mixture is then put through a homogenizer for the purpose of dispersing the ingredients as much as possible. The mixture is then cooled rapidly as by passing it in a thin film over a chilled surface. The ice cream is then frozen. During the freezing of the mix the beaters beat in a considerable amount of air in order to improve the lightness and texture of the frozen product. The increase in bulk due to the incorporation of the air is normally referred to as the "overrun."

In the manufacture of ice cream, the caseinate of sodium may be conveniently added near the end of the pasteurization step. The alginous material may be added at the same time or thereafter, the alginous material preferably being incorporated before the mixture is passed through the homogenizer. While the materials referred to may be incorporated earlier in the process, the heat of pasteurization has an effect of depolymerization of the algin molecule, thus affecting its value as a stabilizing factor. When the ice cream is manufactured using both caseinate of sodium and alginous material according to this invention, the alginous material, being present uncontaminated by free calcium, is in a form that greatly increases the amount of "overrun" that can be produced in the manufacture of the ice cream. The "melt" of the ice cream, that is its consistency when melted, is also improved.

The fact that the caseinate of sodium may be incorporated simultaneously with the alginous material, makes it possible to produce as a new article of manufacture a preformed ready-to-use colloidal stabilizer for ice cream, this stabilizer containing caseinate of sodium (such as sodium caseinate or sodium phosphocaseinate or a mixture of these materials) together with alginous material. Usually the preformed material should contain caseinate of sodium in major proportion, e. g., sodium caseinate, or sodium phosphocaseinate or a mixture thereof using about 1.5 to 2 parts of caseinate of sodium to one part of alginous material. This composition is preferably prepared in the form of a dry powder and the powder can be added directly to the ice cream mix. If the alginous material is added to the mixture in a liquid condition, it is preferably added after the caseinate substance has been incorporated in order to convert all of the calcium chloride to a non-ionized form before the alginous material is incorporated. Even when the alginous material is used in liquid condition, however, the caseinate substance may be commingled therewith prior to incorporation in the mix and still retain with little or no impairment the desired effectiveness of the alginous material. If the alginous material is incorporated in liquid form, the liquid should preferably be prepared at approximately room temperature in order not to adversely affect the properties of the alginous material.

There are complex caseinates of sodium other than sodium phosphocaseinate which may be used according to this invention such as sodium hydrochloricaseinate, sodium sulphocaseinate, sodium citrocaseinate and the like. However, of the complex caseinates, the phosphocaseinate is regarded as distinctly preferable, inasmuch as it is especially effective in transforming free calcium to a non-ionized state and inasmuch as the phosphocaseinate is easily assimilated and contains phosphorus, the phosphorus in assimilable form being a valuable ingredient of foods.

Other soluble caseinates than caseinates of sodium may be used in the practice of this invention, namely, the caseinates of alkali metals. The caseinate of sodium is, however, distinctly preferable for use in food products, since potassium has a somewhat toxic effect. Ammonium, which is also properly classifiable as an alkali metal, while useful to produce the chemical and physico-chemical effects above-described, is somewhat objectionable in a food product due to its pronounced odor.

As above-mentioned, the soluble caseinates are extremely advantageous and are highly effective in removing free calcium from the milk ingredients, inasmuch as they react with the calcium by a double decomposition reaction. However, even the use of an insoluble or partially insoluble calcium caseinate prepared in advance is not completely without merit in that it has the property of converting some of the free calcium chloride in the milk to colloidal form by the phenomenon of adsorption as hereinabove described. It is possible, by using a sufficiently large quantity of calcium caseinate, to adsorb free calcium in the form of calcium chloride, so as to form chlorocaseinate of calcium in the milk product, the calcium in this form being substantially non-ionized and in a condition which does not adversely affect alginous material which is also incorporated in the product. Since, however, the amount of an insoluble caseinate that is required is much greater than the amount of soluble caseinate that is required to remove the free calcium from the milk ingredients, the use of soluble caseinates is regarded as distinctly preferable according to this invention. While other insoluble caseinates than caseinate of calcium may be used such as the caseinates of barium, strontium, magnesium and the like, these caseinates are less desirable in food products than caseinates of calcium, because they have a more or less toxic effect and because they are somewhat less effective in adsorbing calcium chloride and converting the calcium to a non-ionized state. The term "caseinate substance" is used herein in referring generally to both soluble and insoluble caseinates.

As hereinabove mentioned, this invention not only is useful in the manufacture of ice cream, but also is useful in connection with other milk products, namely, products containing milk, in which milk ingredients, either by themselves or in combination with other ingredients, preferably occur in a dispersed state such as a colloidal state. Products including cream are to be regarded as milk products as this term is used herein.

According to this invention, the stability of milk products can be greatly increased and since the calcium in the milk is not removed or rendered unassimilable, the product contains all the nutritive value that it would have in the absence of the incorporation of the materials used according to this invention. In addition, it is to be noted that the materials which are added are of themselves of a nutritive character in assimilable form. Since milk, in itself, contains casein, it is apparent that the additional caseinate in no way contaminates the normally-occurring ingredients of the food product as would be the case if inorganic substances or the like were used. Moreover, when the caseinate is added in the form of phosphocaseinate, the ice cream is given an added nutritive value due to the additional phosphorus that is incorporated.

Milk products, such as ice cream, chocolate syrup, milk chocolate, are normally made and sold containing a relatively large amount of water in which the various ingredients are dissolved or suspended. It is apparent, however, that, any such product produced according to this invention can be dehydrated, and that in such case, the advantages and features of this invention that have been described herein would be realized during the preparation of the product and would be valuable in any preparation produced by adding water to the dried product. Thus dried products can be prepared according to this invention such as malted milk, milk chocolate drinks sold in powdered form, ice cream powder and the like. Moreover, while this invention is of particular utility in connection with products used for food, it is not necessarily limited to food products, inasmuch as this invention is applicable in connection with the stabilization and dispersion of milk ingredients of any milk product.

While this invention has been described in connection with certain specific illustrations, it is to be understood that this has been done for the purpose of affording an understanding of the practice of this invention and that the practice of this invention, as illustrated by the examples which have been given, can be varied within the scope of this invention as determined by the language of the following claims.

I claim:

1. In the preparation of a milk product the step comprising treating dissolved calcium salt of the milk with an alkali-metal caseinate in an amount that is substantially the molar equivalent of said dissolved calcium salt of the milk to convert the calcium of said dissolved calcium salt to a colloidally-dispersed and non-ionizing caseinate compound of calcium, said caseinate compound of calcium being maintained in colloidal solution in the product in the presence of alginous material as a stabilizing agent.

2. In the preparation of a milk product containing colloidally-dispersed milk ingredients and incorporated alginous material, the step comprising incorporating in the milk ingredients (including dissolved calcium salt) of said product not later than simultaneously with the incorporation of said alginous material an alkali metal caseinate in an amount that is substantially the molar equivalent of said dissolved calcium salt to form with the dissolved calcium salt of the milk a colloidally dispersed substantially non-ionizing compound of calcium in which the calcium is maintained with greater affinity than the affinity between calcium and said alginous material, said calcium compound being retained in colloidal solution in the milk product.

3. In the preparation of a milk product containing colloidally-dispersed milk ingredients and incorporated alginous material, the step comprising incorporating with the milk ingredients containing dissolved calcium salt not later than simultaneously with the incorporation of said alginous material caseinate of sodium in an amount that is substantially the molar equivalent of said dissolved calcium salt to form a non-ionizing and colloidally-dispersed caseinate compound of calcium with the calcium of said dissolved calcium salt.

4. A method of manufacturing ice cream which comprises incorporating in the ice cream mix containing dissolved calcium salt alginous material and caseinate of sodium in an amount that is substantially the molar equivalent of said dissolved calcium salt, the caseinate of sodium being incorporated in the milk ingredients of the mix not later than simultaneously with the incorporation of the alginous material to form with dissolved calcium salt of the milk ingredients of the mix a colloidally-dispersed non-ionizing caseinate compound of calcium which is retained in said colloidally-dispersed form in said mix and in the ice cream product.

5. In a method of manufacturing ice cream wherein an ice cream mix containing dissolved calcium salt is pasteurized, homogenized, cooled and frozen, the step comprising incorporating in the milk ingredients of the mix between the inception of the pasteurization step and the homogenizing step alginous material and caseinate of sodium in an amount that is substantially the molar equivalent of said dissolved calcium salt, said caseinate of sodium being incorporated not later than simultaneously with the incorporation of the alginous material to form with dissolved calcium salt of the milk ingredients of the mix a colloidally-dispersed non-ionizing caseinate compound of calcium which is retained in said colloidally-dispersed form in said mix and in the ice cream product.

6. An ice cream product which comprises colloidally-dispersed ingredients including colloidally-dispersed milk ingredients, which is substantially free of inorganic calcium salt and of alkali-metal caseinate, and which contains a non-ionizing casein compound of calcium in addition to said milk ingredients, said casein compound of calcium being in a colloidally-dispersed state in the presence of alginous material as a stabilizing agent.

7. A method according to claim 1 wherein said alkali-metal caseinate contains sodium phospho caseinate.

8. A method according to claim 3 wherein said caseinate of sodium has a pH greater than 7.

VICTOR CHARLES EMILE LE GLOAHEC.